Oct. 3, 1967     A. J. LOMMEN ET AL     3,344,485
ROPE CLAMP AND CLEVIS
Filed July 12, 1965

INVENTORS
ALAN J. LOMMEN
MERREL M. HAAKENSON
BY Merchant, Merchant & Gould
ATTORNEYS

United States Patent Office 3,344,485
Patented Oct. 3, 1967

3,344,485
ROPE CLAMP AND CLEVIS
Alan J. Lommen and Merrel M. Haakenson, both of
Dickey, N. Dak. 58431
Filed July 12, 1965, Ser. No. 471,071
3 Claims. (Cl. 24—126)

This invention pertains to a new and improved clamp for attaching a clevis to the end of a rope and more particularly to apparatus having means similar to a clevis for attachment to an exterior device, which apparatus securely grips the end of a rope with substantially no relative movement between the rope and the apparatus.

In general there are two types of prior art devices. In the first group of prior art devices a member such as a honda is permanently braided into the end of the rope. This requires a great deal of work and, in the event that nylon rope is being used braiding is very difficult and in some cases ineffective. Thus, the devices in the first group are extremely complicated to utilize and for some types of rope are not very effective.

In the second group of prior art devices various clamps are utilized to attach clevises and the like to the end of ropes but these clamps allow slight relative movement of the rope therein. This slight movement will eventually fray the rope and cause breakage thereof. This is especially true in the use of nylon ropes since nylon is very sensitive to heat while under tension and fraying with consequent breakage will occur very quickly when nylon ropes are utilized in this type of prior art device.

In the present device apparatus is securely clamped to the end of the rope which allows substantially no relative movement therebetween. Further apparatus similar to a clevis is fixedly attached to the clamping apparatus to provide for attachment of the rope to an exterior device. The present apparatus is relatively simple to utilize and can quickly be attached to the end of any rope having dimensions suitable to the particular clamp being utilized, including nylon rope. Once the clamp is attached to a rope it grips the rope in a fashion to substantially prevent any relative movement therebetween. Thus, the present apparatus effectively solves the problems which were prevalent in prior art devices.

It is an object of the present invention to provide an improved rope clamp and clevis.

It is a further object of the present invention to provide a rope clamp and clevis which can be securely attached to the end of any rope with substantially no subsequent movement therebetween.

It is a further object of the present invention to provide a rope clamp and clevis which can be quickly and easily attached to the end of any rope.

It is a further object of the present invention to provide a rope clamp and clevis that can be attached to a nylon rope and which substantially prevents center-slipping of said nylon rope.

These and other objects of this invention will become apparent to those skilled in the art upon consideration of the accompanying specification, claims, and drawings.

Referring to the drawings, wherein like characters indicate like parts throughout the figures.

Figure 1:
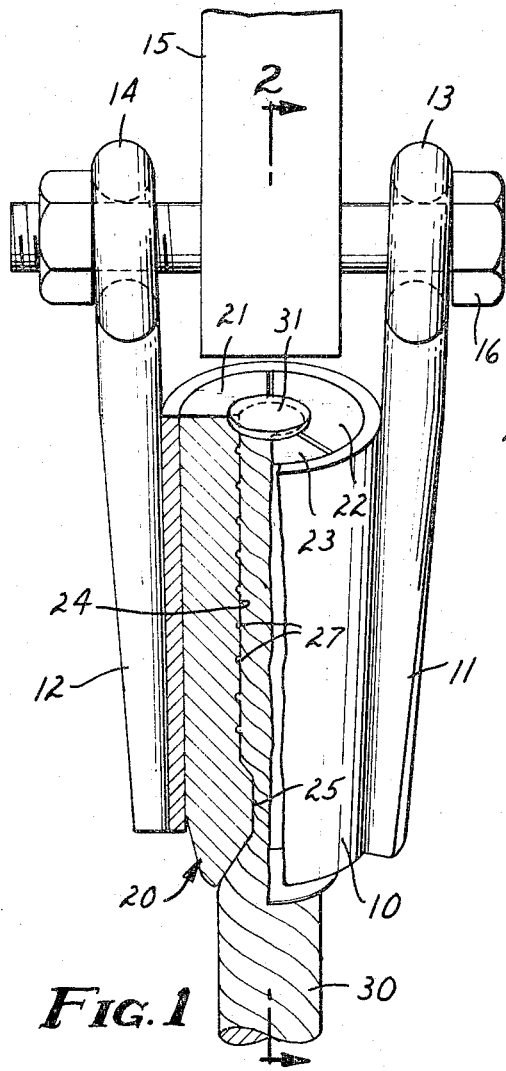
FIG. 1 is a view in perspective of the present invention, parts thereof broken away and shown in section.
Figure 3:
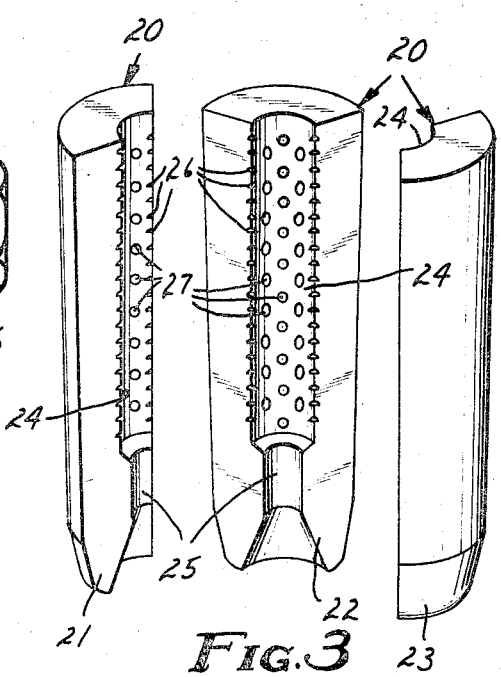
FIG. 3 is an exploded view in perspective of the inner cylindrical plug.
Figure 2:
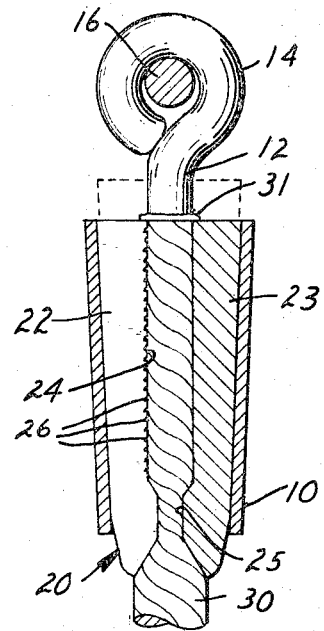
FIG. 2 is a sectional view as seen from the line 2—2 in FIG. 1.
Figure 4:
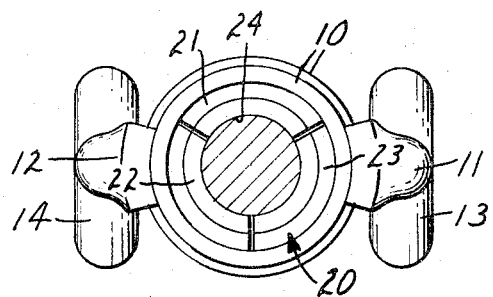
FIG. 4 is a view of the present invention as seen from the bottom in FIG. 1 with the rope shown in section.

In the figures the numeral 10 designates the main body or outer cylindrical member of the clamp. The body 10 has a centrally located longitudinal hole therethrough which is radially tapered with the largest radius at the top thereof, in FIG. 1, and the smaller radius at the bottom. In the present embodiment the body 10 has a uniform thickness throughout the entire length but it should be understood that the outer surface could be a uniform right cylinder with only the hole therethrough being radially tapered.

Two rod-like members 11 and 12 are attached to either side of the body 10 by some means such as welding. The rods 11 and 12 extend the length of the body 10 and one end of each of the rods 11 and 12 is flush with the lower end of the body 10. The upper ends of the rods 11 and 12 extend past the upper end of the body 10 and are bent to form circles or eyes 13 and 14 respectively. The eyes 13 and 14 are substantially coaxial and are positioned above the upper end of the body 10 a sufficient distance for free pivotal movement therebetween of an exterior apparatus 15, which may be any apparatus to which it would be desirable to connect the present invention an example of which might be a vehicle bumper or frame, a wagon tongue, etc. The rods 11 and 12 operate in a fashion similar to a clevis and can be pivotally attached to the exterior apparatus 15 by some means such as bolt 16 which passes through the eyes 13 and 14 and a hole in the exterior apparatus 15.

A second cylindrical member or cylindrical-shaped plug is generally designated 20. Cylindrical-shaped plug 20 is composed of three longitudinally separable sections 21, 22 and 23, each section forming an arcuate portion of the cylindrical plug 20. The three sections 21, 22 and 23 are substantially similar in the illustrated embodiment but it should be understood that any plurality of sections might be utilized and, while producing similar sections greatly simplifies the manufacture of the present apparatus, the sections do not have to be similar. When the sections 21, 22 and 23 are placed together to form a solid cylinder the outer surface thereof is radially tapered to mate with the inner surface of the body 10. The extreme lower end of the outer surface of the plug 20 is tapered at a much greater rate, or rounded, to aid in inserting the plug 20 into the body 10.

The plug 20 has a centrally located longitudinal hole 24 therethrough the sides of which are substantially straight except for the lowermost portion thereof. Adjacent the lower end of the plug 20 the radius of the hole 24 is greatly reduced to produce a flange or collar 25 therein. The surface of the portion of the hole 24 having substantially straight sides is roughened by some means such as the inverted dish-shaped marks 26 produced by a grinding wheel and/or the punch marks 27. The extreme lower end of the hole 24 in the plug 20 is flared outwardly in an inverted cone-shaped pattern.

When it is desired to connect the end of a rope, such as the nylon rope 30, by means of the present apparatus the following procedure is followed. The end of the rope 30 is passed through the body 10 from the bottom to the top and the sections 21, 22 and 23 are placed therearound to form plug 20 with a small portion of the rope 30 extending past the upper or large end thereof. The plug 20 with the rope 30 therebetween is then placed in the upper end of the body 10 and forced therein manually as far as possible. The plug 20 with the rope 30 chambered therein is then seated snugly in the body 10 by some means such as a hydraulic jack or the like. While more or less pressure might be required it was found during experiments that approximately 50,000 pounds of pressure were required to properly seat the plug 20 in the body 10. It should be noted that the hole 24 in the plug 20 is in general substantially smaller than the rope 30. An example of possible dimensions that could be used is a ⅝-inch diameter for the hole 24 and a ⅜-inch diameter for the collar 25 with a 1-inch diameter rope 30. These dimensions are simply illustrative and do not limit this invention in any way.

The roughened surface of the hole 24 greatly increases the friction therein whereby the rope 30 is clamped more firmly in place. However, in the event that the rope 30 is a nylon rope there is a tendency for a phenomenon known as center-slipping to occur. Because nylon has a relatively slippery surface the strands of nylon making up the rope have very little friction therebetween and the center strands may stretch and in some cases even pull out of the rope, while the outer strands remain fixedly in place. The collar 25 produces a maximum force on the rope 30 at the lower end of the plug 20 which substantially prevents any center-slipping or stretching of the center fibers of the portion of the rope 30 which is chambered in the hole 24. The extreme end of the rope 30 which extends past the upper or large end of the plug 20 is heated to substantially the melting point to produce a disk-shaped wafer 31 at the extreme end of the rope 30 which seals the end of the hole 24 while aiding in the prevention of center-slippage of the rope 30.

Thus, the present invention securely clamps the end of any rope, including a nylon rope, and provides a means for attaching exterior apparatus to the rope. The present apparatus is relatively inexpensive to manufacture and simple to connect to the end of a rope while being positive acting. Once the plug 20 is forced into the body 10 there is substantially no relative movement between the rope 30 and the plug 20 even though the rope 30 is a nylon rope. Thus, the present invention is effective in preventing center-slippage and the rope will not wear or pull apart under great strains.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:
1. Connecting apparatus comprising:
   (a) a rope composed at least in part of nylon;
   (b) a first cylindrical member having a radially tapered longitudinal hole therethrough;
   (c) means fixedly attached to said first member for further removable connection with exterior apparatus;
   (d) a second cylindrical member having a radially tapered outer surface mated within said hole in said first member and a longitudinal hole therethrough having said rope positioned therein with the main body of said rope extending outwardly from one end thereof and one end of said rope extending outwardly a short distance from the other end thereof, the diameter of said hole through said second member being somewhat smaller than the diameter of said rope, and said second member including a plurality of longitudinally separable sections each section forming an arcuate portion of said cylindrical section about said rope;
   (e) said one end of said rope extending outwardly from the hole in said second member being at least partially melted to produce a relatively solid enlarged portion of said rope;
   (f) the surface of said hole through said second member having a plurality of indentations formed therein;
   (g) said hole in said second member having a radius substantially smaller than the radius of said rope and a portion having a substantially reduced radius for providing an extra gripping force on said rope to prevent substantially any relative movement between said rope and said second member; and
   (h) the hole through said second member tapering radially outwardly adjacent said one end to provide a smooth surface over which said rope resumes its normal diameter.

2. A rope clamp for a stranded plastic rope comprising:
   (a) a first cylindrical member having a radially tapered longitudinal hole therethrough;
   (b) means fixedly attached to said first member for further removable connection with exterior apparatus;
   (c) a second cylindrical member having a radially tapered outer surface which mates with said hole in said first member and having a longitudinal hole therethrough adapted to receive an end of a rope therein with the rope extending outwardly from one end thereof, the diameter of said hole through said second member being somewhat smaller than the diameter of the rope, and said second member including a plurality of longitudinally separable sections each section forming an arcuate portion of said cylindrical member;
   (d) the surface of said hole through said second member having a plurality of longitudinally and circumferentially spaced, radially inwardly opening dimple-like indentations formed in the inner surface of said second member for engaging said strands;
   (e) the hole through said second member tapering radially outwardly adjacent said one end to provide a smooth surface over which the rope will resume its normal diameter; and
   (f) the cylindrical hole through the second cylindrical member having a smooth portion adjacent said one end with a substantially reduced radius to prevent substantially any relative movement between said rope and said second member.

3. The rope clamp set forth in claim 2 wherein the means fixedly attached to said first member comprise two members attached adjacent one end to the first member each having a hole therethrough and said holes being axially aligned for insertion of a bolt or the like therethrough.

References Cited
UNITED STATES PATENTS

| | | |
|---|---|---|
| 1,814,609 | 7/1931 | Smith 24—126 |
| 1,882,878 | 10/1932 | Plyler. |
| 2,060,864 | 11/1936 | Hedler. |
| 2,233,794 | 3/1941 | Noble. |
| 3,058,386 | 10/1962 | Morrow. |
| 3,163,902 | 1/1965 | Bernburg 24—126 |
| 3,205,300 | 9/1965 | Becker 24—126 X |

BERNARD A. GELAK, *Primary Examiner.*